Figure 4:
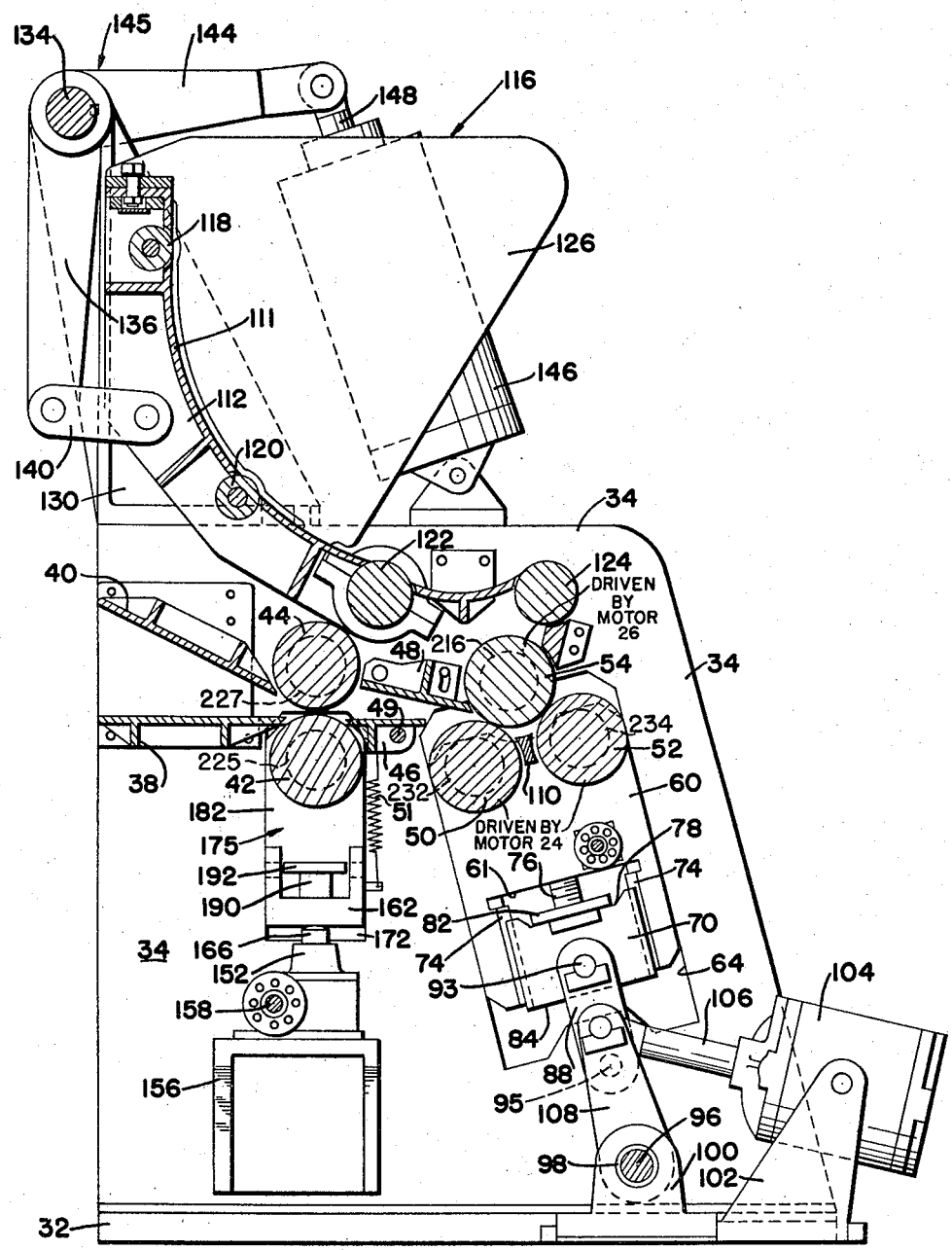

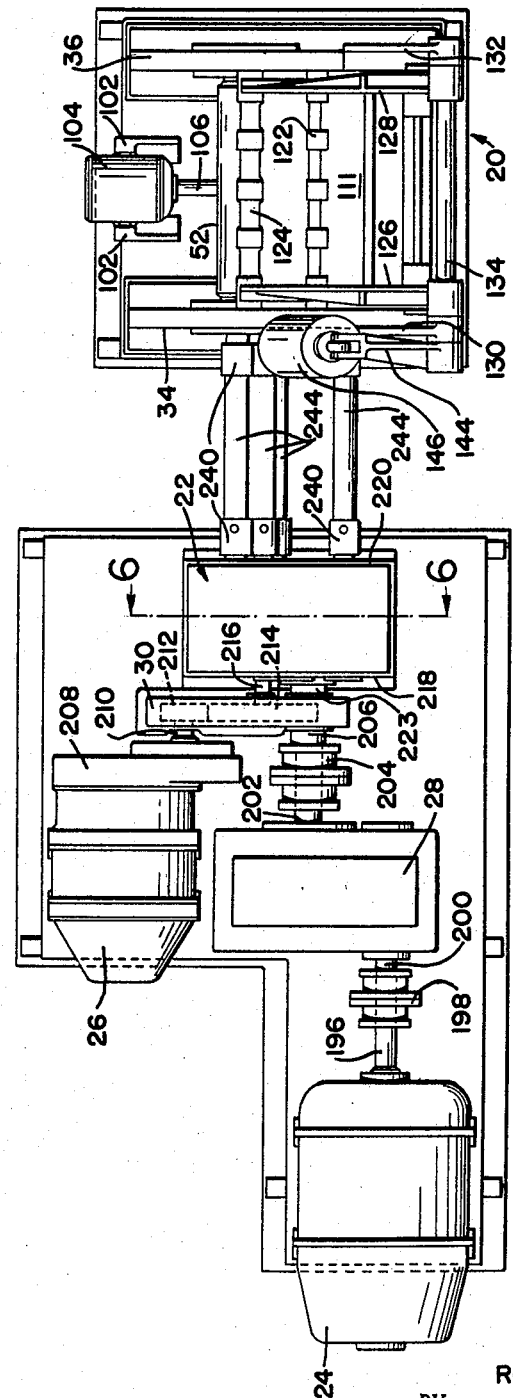

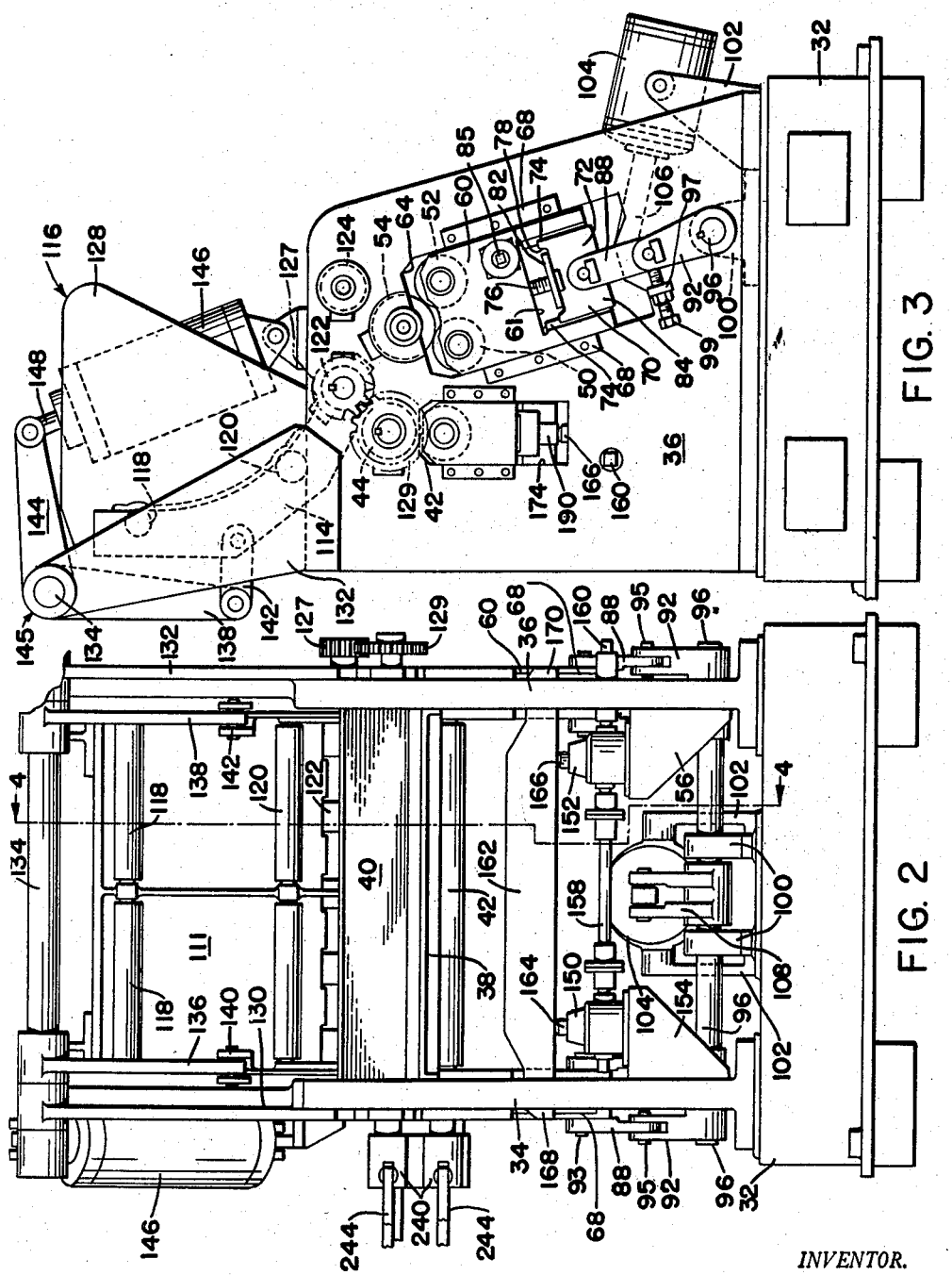

FIG. 5

INVENTOR.
ROBERT POTTER
BY Bosworth, Sessions,
Herrstrom & Williams
ATTORNEYS

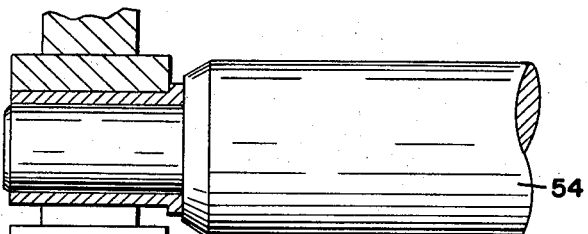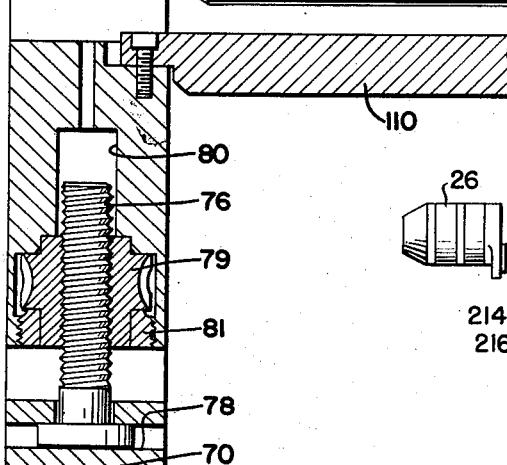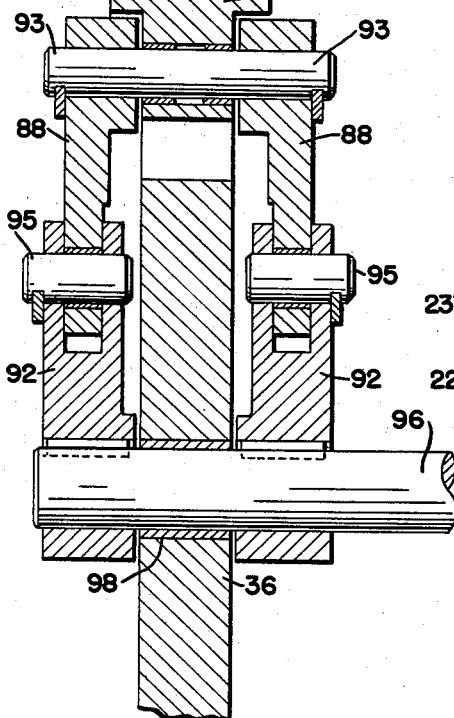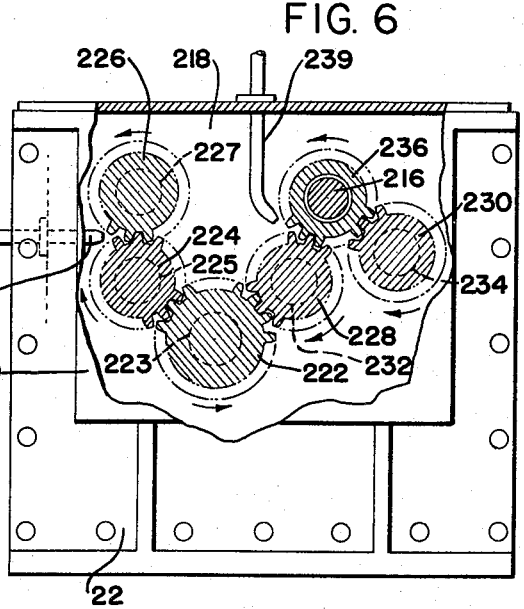

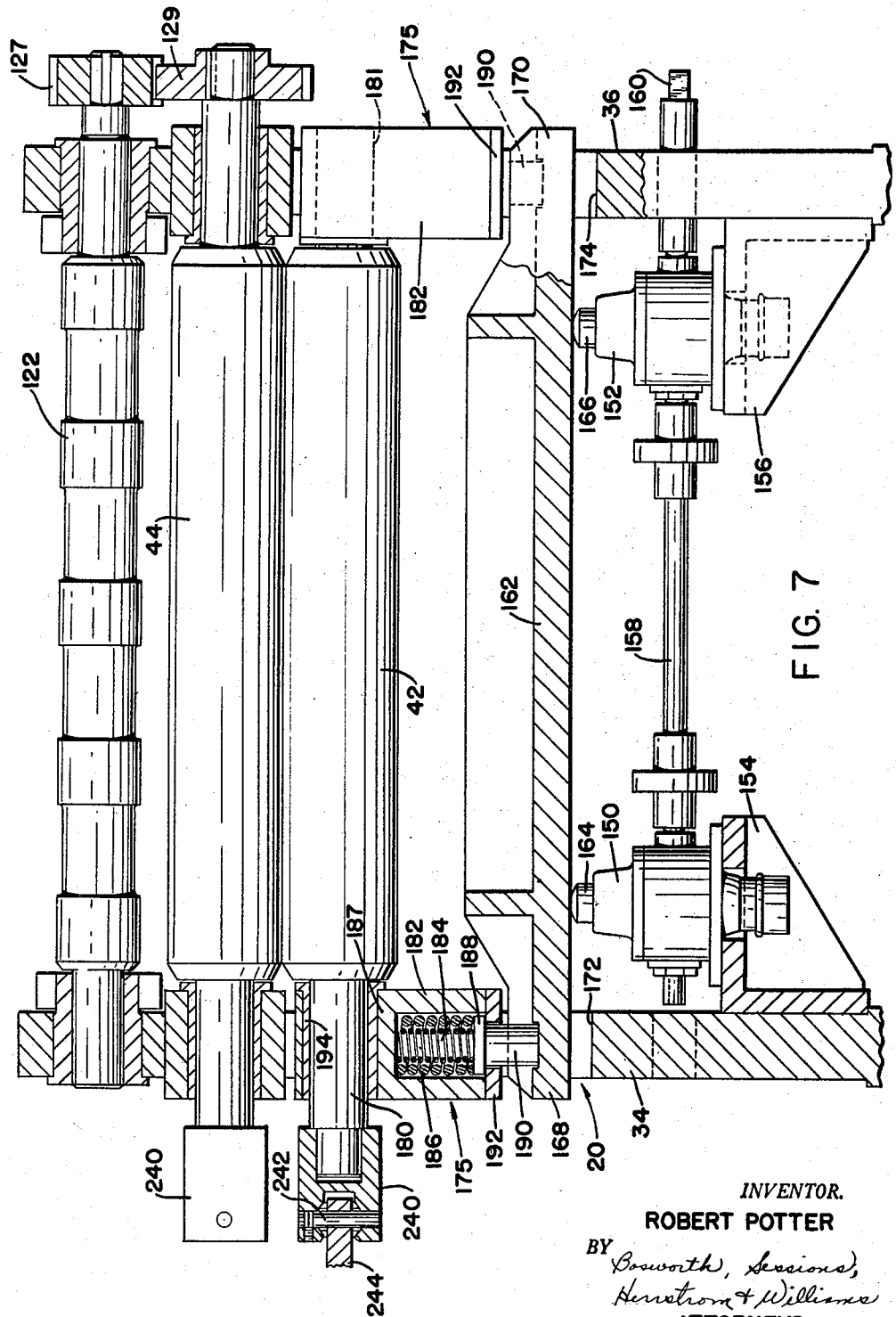

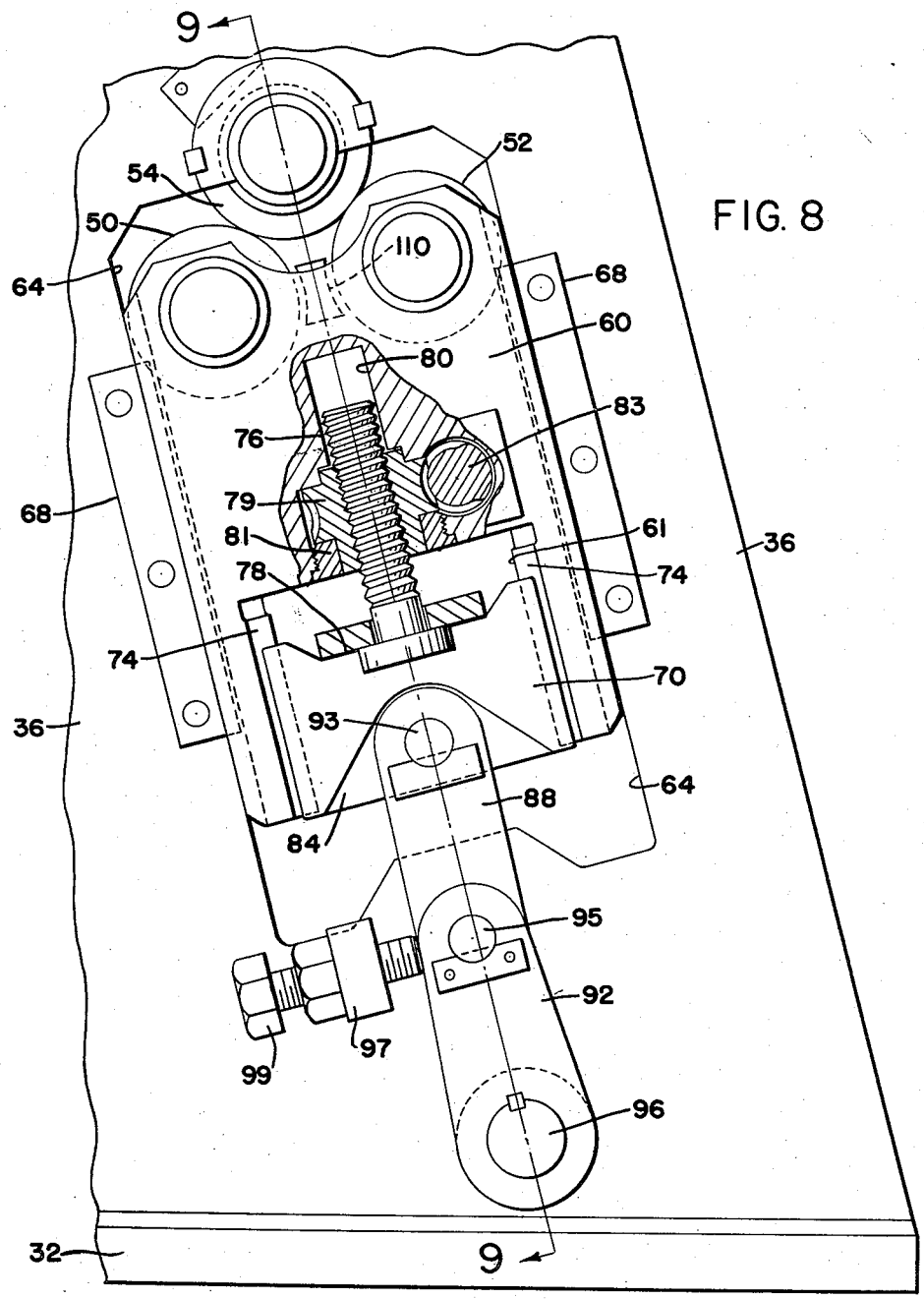

United States Patent Office 2,877,821
Patented Mar. 17, 1959

2,877,821

UPCOILER WITH ROLLS INDEPENDENTLY DRIVEN AT SURFACE SPEED OF MATERIAL BEING COILED

Robert Potter, Salem, Ohio, assignor to E. W. Bliss Company, Canton, Ohio, a corporation of Delaware Application August 4, 1954, Serial No. 447,735

6 Claims. (Cl. 153—54)

This invention relates to coiling machines of the type used at the delivery end of a rolling mill, and more particularly to coiling machines operable to impart a slight permanent curvature to strips of metal as they pass therethrough to cause the strips to form into rolls or coils.

Still more particularly, the invention relates to a coiling machine which will within the limits of the machine coil strip of any thickness into rolls without marring or scratching either surface thereof.

In the type of coiling machine heretofore employed, and of which the present invention is an improvement, the coiling means normally comprise a set of three rollers arranged in pyramidal relation wherein the two base rollers are vertically adjustable to nest the apex roller therebetween, or conversely, the apex roll is vertically adjustable to nest between the two base rolls. If the machine is an upcoiler, that is to say, if the strip is deflected upwardly to form a coil, then the apex roller is on top of the base rollers and the top tangential plane of the base rollers may be inclined upwardly in the direction of travel of the strip. On the other hand, if the machine is a downcoiler, i. e., the strip is deflected downwardly to form a roll, then the positions of the apex and base rollers are reversed.

In the earlier coiling machines, it was thought necessary to drive the rollers at a greater surface speed than the material being coiled in order to take up the slack between the coiler and the rolling mill and in order to pull the metal out straight from the rolls of the mill. This mode of operation resulted in very objectionable marring and scratching of the surface of the strip by the coiling rollers. In an effort to reduce or eliminate the scratching and marring of sheet surfaces, a pair of pinch rollers were interposed between the mill and the coiling machine which securely gripped opposite surfaces of the strip therebetween and rotated at the same surface speed of the strip. The coiling rollers, which were of the same diameter as the pinch rollers, were geared to and driven by the pinch rollers so that all five rollers rotated at the same speed, that of the surface speed of the strip.

However, some slippage must occur with apex and base rollers of the same diameter, since the surface speed of the strip on the inside of its curved portion will be less than the surface speed of the strip on the corresponding outside portion of the curve. This slippage progressively increases as the thickness of the strip being coiled increases, thereby causing the relative surface speed between opposed surfaces to increase. Accordingly, marring and scratching still are present on the surfaces of coiled strip to some extent, and as the standards of finished and polished surfaces required by industry increase, these imperfections become increasingly more objectionable.

It is, therefore, an important object of the present invention to provide a coiling machine which will form strip material into rolls or coils with less scratching and marring of the surfaces of the strip than heretofore obtainable.

Other objects include the provision of a coiling machine having pyramidally arrayed bending rollers of which the apex roller is driven independently of the base rollers; the provision of a coiling machine having pinch rollers and bending rollers driven from a novel pinion stand; the provision of a coiling machine which will form strip into rolls without scratching or marring the surface of the strip regardless of the thickness of the strip or the diameter of the apex bending roller relative to the base bending rollers; the provision of a coiling machine which can form strip into rolls of different core diameters by employing apex rollers of different diameters; and the provision of a coiling machine having novel roller adjusting means and novel coil cradle kickoff means.

To the attainment of these and related objects as will appear hereinafter, said invention, then, consists of the means fully described and particularly pointed out in the claims, the annexed drawings and the following description, setting forth in detail certain structure embodying the invention, such disclosed means constituting, however, but one of various forms in which the principle of the invention may be used.

Figure 1 is a plan view of the coiling machine in which is also shown a pinion stand with coupling means secured therebetween, and motor drive means connected to said pinion stand, Figure 2 is an elevation of the receiving side of the coiling machine in which is shown pinch roller and base coiling roller adjusting means as well as the coil kickoff means, Figure 3 is a side elevational view of the coiling machine showing the pinch rollers and the base coiling rollers in their strip engaging positions, Figure 4 is a partially sectioned side elevation of the coiling machine taken on the line 4—4 of Figure 2, showing in greater detail the rollers in the coiling position and the coil cradle in the coil supporting position, Figure 5 is a partially sectioned side elevation similar to Figure 4, but showing the base coiling rollers in a lowered position and the coil cradle in the kickoff or forward position, Figure 6 is a partially sectioned elevation of the pinion stand taken on the line 6—6 of Figure 1, Figure 6a is a fragmentary schematic plan view of the separate and independent drive means of the apex roller of the forming rollers of the apparatus, Figure 7 is a partially sectioned elevation of the pinch roller adjusting means, Figure 8 is a fragmentary, partially sectioned view of the bending roller adjusting means, and Figure 9 is a vertical section taken on the line 9—9 of Figure 8.

Referring now to the drawings in more detail, the invention in general, comprises an upcoiler 20 (Figure 1) driven from a pinion stand 22, which in turn is powered by motors 24 and 26 through reduction gear boxes 28 and 30 respectively.

*The upcoiler*

Considering first the structure of the upcoiler, a base 32 (Figure 2) supports a pair of horizontally spaced side members 34 and 36 adapted to receive therebetween metal strip from the end of a rolling mill. The strip is directed between guide plates 38 and 40 (see also Figure 4) and between a pair of pinch rollers 42 and 44 which are vertically aligned and extend horizontally between side members 34 and 36. The ends of the pinch rollers 42 and 44 are journaled in adjacent side members and the lower pinch roller 42 is vertically adjustable, as will be discussed more fully as the description of the invention progresses.

A second pair of guide plates 46 and 48 (Figure 4) receives the strip after it has passed between the pinch rollers 42 and 44 and directs it into a set of three bending or coiling rollers. Guide plate 46 is pivotally mounted on pins 49 carried in side members 34 and 36, and a coil spring 51 maintains the said guide plate 46 in contact with pinch roller 42 as it is adjusted vertically to accommodate various thickness of strip. The set of three rollers is pyramidally arrayed and comprises a pair of base rollers 50 and 52 and an apex roller 54 adapted to nest between the said base rollers. These rollers 50, 52, and 54 are parallel and extend horizontally between side members 34 and 36 and the roller end portions are journaled therein. Apex roller 54 is positioned above the base rollers 50 and 52 which are aligned so that the tangential plane of the base rollers is inclined slightly upwardly in the direction of travel of the strip. Pinch rollers 42 and 44 and base rollers 50 and 52 are driven by motor 24, and apex roller 54 is driven by motor 26. The means for connecting the rollers to their respective motors will be set forth more fully hereinafter.

The apex roller 54 (see Figure 8) is immovably journaled in side members 34 and 36, but base rollers 50 and 52 are journaled in a pair of adjustable side plates or chocks 60, which are slidably fitted in windows 64 of side members 34 and 36 respectively, and gibs or keepers 68 are secured to the side members adjacent these windows 64 slidably to hold said chocks therein. Further the finer adjustment of the base rollers 50 and 52 is provided by inner chocks 70 which are fitted to slide within the U-shaped lower portions 61 of chocks 60. Inner chocks 70 are carried on ways 74 and are adjusted thereon by screws 76 which fit in recesses in the top edges 78 of the said inner chocks 70 and extend upwardly into cylindrical counterbored cavities 80 of chocks 60. Worm wheels 79 threadedly engage screws 76 and are held in cavities 80 by retaining nuts 81 which are threadedly supported by the vertical walls of the said cavities. A worm 83 engages worm wheels 79, one end of which extends beyond side member 36 and has formed thereon a squareheaded shank 85 adapted to receive any standard turning device such as a hand crank, lever or motor for rotating said worm to adjust inner chocks 70 relative to outer chocks 60.

The lower ends 84 of inner chocks 70 carry pairs of pivotal links 88 (see also Figure 9) to depend therefrom on pins 93 and to engage pivotally pairs of bifurcated levers 92 by means of pins 95. The said pairs of links 88 and levers 92 straddle side members 34 and 36 respectively and levers 92 are rigidly secured to opposite ends of a shaft 96 journaled in sleeves 98 and extending transversely through the lower portions of side members 34 and 36. Lugs 97 are integrally secured to and extend transversely from side members 34 and 36 to carry adjusting screws 99. The ends of adjusting screws 99 bear against the upper ends of levers 92 to restrict pivotal movement to the left as seen in Figure 8 beyond any predetermined point. A bifurcated lever 108 (see Figures 2 and 3) is secured to the center of shaft 96 and the shaft is supported on opposite sides of lever 108 by a set of brackets 100 which are secured to the base 32 of the machine. A second set of brackets 102 are also similarly secured to base 32 to the right of brackets 100, as seen in Figure 3, to support pivotally an air cylinder 104. The piston 106 of the air cylinder 104 is pivotally secured at its free end portion to a lever 108 which is rigidly secured to shaft 96 at its mid-portion.

With the above described linkage system connecting the inner chocks 70 to the air cylinder 104, it will be evident that a retraction of the piston 106 into the air cylinder, from the position shown in Figure 4 to the position shown in Figure 5, will draw base rollers 50 and 52 downwardly and away from apex roller 54. In this position, the sheet will pass between the rollers without being coiled, thus forming a tail on the coil. For instance, when the end of a strip leaves the last stand of mill rolls, the base rollers are lowered to leave on the end of the coil a straight uncoiled tail portion for use in starting the coil through the mill in subsequent re-rolling operations. This also provides a means whereby the coiling machine may be bypassed, if it is desired to roll a flat strip. Any suitable air or hydraulic cylinder may be used and in the preferred embodiment of the invention, a cylinder is employed having a piston with a six inch stroke.

The space between the base rollers 50 and 52 and the apex roller 54 (see Figure 4) is also adjusted by rotating screws 76 as aforesaid, not only to adjust the rollers to accommodate the thickness of the sheet material currently being rolled and coiled, but also to control the core diameter of the coil itself. As sheet material passes between rollers 50 and 54, it is intercepted by roller 52 and deflected upwardly a sufficient amount to give a permanent set to the material. It is this set which determined the size of the coil to be formed. To assist in giving a set to the material, the rollers may be so disposed that the tangent between rollers 50 and 54 is inclined downwardly and the tangential points of contact on the two rollers are below the horizontal path traveled by the material prior to being guided between rollers 50 and 54. To this end deflecting plate 48 initiates the deflection of the material downwardly into a tangential path between rollers 50 and 54. The material then strikes a curved deflecting block 110 between rollers 50 and 52 and is guided upwardly through rollers 52 and 54 which complete the permanent set given to the material. Thus the position of the base rollers 50 and 52 with respect to apex roller 54 determines the core diameter of the coil.

The coil kickoff cradle

After the sheet material passes through the bending rollers, it is necessary temporarily to store it while the rest of the coil is being formed. It is also desirable to have the final coil so located that it may be easily handled and transported from the coiling machine. To this end, a coil kickoff cradle is provided in conjunction with the coiling machine and will now be described.

As the curved sheet material travels beyond the rollers 52 and 54 (see Figure 4), its curvature is such that it moves upwardly and rearwardly in an arcuate path, the radius of which has been determined by the set of the material until the leading edge of the sheet material makes contact with the curved plate 111 carried by arms 112 and 114 of the coil kickoff cradle 116.

Cradle arms 112 and 114 are provided with idler rollers 118 and 120 to guide the sheet material into a gentle circular loop to form the first or inner layer of the coil. As subsequent layers of material are formed on the outside of the initial loop, they are successively cradled to rest on rollers 122 and 124, which are power driven to assist in revolving the coil. A spur gear 127 (Figure 7) is keyed to the end of the shaft of the roller 122 and a matching spur gear 129 is keyed to the end of the shaft of pinch roller 44 in driving engagement with spur gear 127. Since pinch roller 44 is rotated at the surface speed of the strip material, roller 122 also rotates at the surface speed of the coiling material to assist in keeping the coil revolving in the cradle 116.

After the coiling operation has been completed, it is necessary to position the coil so that it may be easily transported away from the coiling machine. Arms 112 and 114 of coil kickoff cradle 116 are pivotally fastened to adjacent side members 34 and 36 in axial alignment with roller 122 to extend arcuately upwardly to the left from roller 122 as seen in Figure 4. A pair of side plates 126 and 128 are secured adjacent to arms 112 and 114 respectively to assist in centering the coil while it is forming and to guide it as it is removed from the kickoff cradle 116. Means may also be provided (not shown) to laterally traverse the plates in opposite directions both inwardly and outwardly to accommodate coils of various widths. Secured to the top edges of side members 34 and 36 are a pair of upstanding stanchions 130 and 132 (Figure 2) so placed to support a transverse shaft 134 journaled in their upper end portions. A pair of levers 136 and 138 are rigidly secured to the shaft 134 and depend therefrom. The lower ends of these levers 136 and 138 are pivotally connected to a pair of toggle links 140 and 142 (see Figures 3 and 4) which connect the levers to adjacent cradle arms 112 and 114. A third lever 144 is also rigidly secured to shaft 134 substantially at right angles to lever 136 to form a bell crank-like member 145 having levers 136 and 144 as arms and with arm 144 extending substantially horizontally to the right as shown in Figure 4. An air cylinder 146 is pivotally secured at its base to the top edge of side member 34 and with the free end of its piston rod 148 pivotally fastened to the free end of arm 144 of bell crank 145. Thus, as is best shown in Figure 5, upward movement of piston rod 148 revolves bell crank 145 about shaft 134 to pivot cradle arms 112 and 114 forwardly about the axis of shaft 122 by means of toggle links 140 and 142. This forward movement of cradle arms 112 and 114 rolls the coil forward where it can be received on a platform of a truck or other means to remove the coil prior to starting another coiling operation.

The pinch rollers

In order to take up the slack between the coiling machine and the mill rolls as well as to pull the metal strip straight out from the mill rolls, a pair of pinch rollers 42 and 44 are incorporated into the coiling machine. These rollers are interposed between the mill rolls and the coiling machine bending rollers 50, 52 and 54, and the lower roller 42 is resiliently and adjustably mounted to maintain pressure on the strip material as it is drawn between the pinch rollers.

The resilient and adjustable mounting means comprises a pair of screw jacks 150 and 152 (Figure 7) supported by a pair of gusset plate brackets 154 and 156 which are rigidly secured to side members 34 and 36 respectively. The screw jacks are simultaneously operated by a worm shaft 158 which passes through side member 36 where the square shank 160 can be fitted with a turning accessory such as a wheel, lever, crank, motor, or the like. A cross beam 162 rests on the ends of the screws 164 and 166 so as to be raised and lowered by the screw jacks 150 and 152. The ends 168 and 170 of cross beam 162 project through openings 172 and 174 in sides 34 and 36 respectively to support resilient bearing means 175 which carry the ends 180 and 181 of pinch roller 42.

Each resilient bearing means 175 includes a coil spring housing 182 containing a set of concentric springs 184 and 186. The housing 182 is a hollow member closed at the top end 187 but open at the bottom to enable the springs 184 and 186 to be inserted therein together with the flanged end 188 of a spring compressing pin 190. The spring compressing pin or rod 190 is held in the housing 182 by means of a collar 192 which overlaps the flanged end 188 of the pin. The collar 192 is fastened to the lower end of the housing 182 such as by threaded fasteners, or the like. Integral with the top end of the housing is a bearing sleeve 194 sized to receive either end 180 or 181 of the pinch roller 42.

The lower pinch roller 42 is vertically adjusted with respect to the upper pinch roller 44 by raising or lowering the beam 162 with screw jacks 150 and 152. This adjustment, of course, will depend on the thickness of the strip material being gripped between the two pinch rollers. Gripping pressure between the rollers is achieved by elevating beam 162 until the pins 190, supported on opposite ends of the beam, compress springs 184 and 186 within housing 182 sufficiently to obtain the desired amount of pressure of the housing top ends 187 against bearings 194.

The drive mechanism

As aforesaid, it is an important object of the invention to provide a coiling machine which will form strip material into rolls or coils without scratching or marring the surfaces of the strip. To this end, a driving mechanism is adapted to rotate the apex and base rollers differentially to compensate for the differential surface speeds of the inner and outer surfaces of the strip material as it progresses from flat strip into a circular form.

As long as the strip material moves in a flat substantially straight path, the surface speeds of the upper and lower surfaces of the material will be the same. However, once the material enters the bending rollers, the surface speed of the concave or curved inner surface of the material is finitely less than that of the convex or curved outer surface of the material. It has been found that this finite difference in speed between the material inner and outer surfaces contributes to the marring and scratching suffered by coiled strip material when the apex roller and the base rollers are driven at the same peripheral speeds. The marring is further aggravated if the apex roller is of perceptibly different diameter than the base rollers.

With the present driving mechanism, it is possible to adjust the relative speeds of the apex and base rollers substantially to eliminate damage to the surfaces of the material caused by relative slipping of the apex roller against the adjacent surface of the material.

The core diameter of the coil is basically determined by the position of the apex roller 54 with respect to the base rollers 50 and 52 which are adjustable by means described hereinabove. In view of the variable speed control of the apex roller 54, a further refinement of adjustment of the core diameter of the coil is possible by varying the diameter of the apex roller as determined by specific requirements. For a coil of smaller core diameter than is obtainable by roller adjustment alone, an apex roller of smaller diameter may be used whereby the peripheral speed of the roller is maintained constant by increasing its angular velocity proportionately. Conversely, for a coil requiring a core diameter greater than is obtainable by adjustment of the rollers alone, a larger diameter apex roller may be used by driving it at a lower angular velocity in order to maintain its peripheral speed equal to that of the surfaces speed of the adjacent material. Thus the advantages of a variable speed apex roller are at least twofold, e. g., substantial reduction of surface marring of the strip material and greater flexibility and control in establishing the core diameters of the coiled material.

Referring once again to Figure 1, the rotor shaft 196 of motor 24 is connected by a coupling 198 to a drive shaft 200 which drives a train of reduction gears (not shown) in the reduction gear box 28. A power takeoff shaft 202 is connected by coupling 204 to the pinion stand drive shaft 206 which drives the pinch roller and base roller pinions, as will be more fully discussed hereinbelow.

A gear reduction head 208 is mounted on the variable speed motor 26 and is connected to gear reduction box 30 by a connecting shaft 210. A pinion 212 is keyed to the end of connecting shaft 210 for driving engagement with gear 214. Gear 214 in turn is keyed to a shaft 216 which is journaled in walls 218 and 220 of the pinion stand 22 to carry a pinion 236 idly thereon.

Within the pinion stand 22, a series of pinion shafts are journaled and drivingly connected by drive bars or links 244 and adapters 240 to the pinch rollers 42 and 44 and coiling rollers 50, 52 and 54 of the coiling machine 20. Shaft 216 is not drivingly connected to the gear box pinions, but transmits power from motor 26 directly to apex roller 54 by means of a pair of the said adapters 240 and one of the said drive bars 244. The pinion stand 22 is located to one side of the coiling machine 20 so that the drive bars 244 extend therebetween transversely to the path of travel of the strip material.

A driving pinion 222 (see Figure 6) is integral with a pinion shaft 223 which is journaled in walls 218 and 220 of the pinion stand 22 and is connected to and driven by drive shaft 206. A pair of pinch roller pinions 224 and 226 are integral with pinion shafts 225 and 227 which are journaled in the pinion stand and are aligned with pinch roller shafts 42 and 44 respectively in the coiling machine 20. Pinions 224 and 226 are meshed and pinion 224 is directly driven by drive pinion 222. Base roller pinions 228 and 230 are integral with shafts 232 and 234 respectively, and idler pinion 236 is fitted idly to rotate on the apex roller drive shaft 216. Pinions 228 and 230 are spaced apart and substantially aligned with base rollers 50 and 52, and shaft 216, as aforesaid, is aligned with apex roller 54 and drivingly connected thereto independent of the pinion stand 22. Pinion 228 is directly driven by drive pinion 222, and pinion 230 is indirectly driven by pinion 228 through idler pinion 236. The pinions are lubricated by oil spray nozzles 237 and 239.

The ends of the pinion supporting shafts 216, 234, 232, 225, and 227 are journaled in the wall 220 of pinion stand 22 to extend therebeyond and are capped with adapters 240, as aforesaid, as are the corresponding ends of the pinch rollers and bending rollers journaled in side member 34 of the coiling machine 20, (see Figure 7). These adapters 240 are bifurcated and fitted with pins 242 which engage and secure opposite ends of connecting drive bars 244 extending between corresponding opposite adapters 240 on the pinion shafts and rollers shafts of the coiling machine 20 and the pinion stand 22 respectively. The pin fittings may be of any conventional design which will permit the roller adapters to be vertically adjusted while the pinion shaft adapters remain stationary. Such fittings are required primarily to permit the base rollers 50 and 52 to be raised and lowered with respect to the apex roller 54, and they also compensate for any possible slight misalignment between the pinion stand 22 and the coiling machine 20.

From the foregoing, therefore, it will be evident that the pinch rollers 42 and 44 and base rollers 50 and 52 are driven at the same rotational speed by motor 24. Since these rollers are of the same diameter, they will also be driven at the same peripheral speed. The apex roller 54, on the other hand, is independently driven by a variable speed motor 26, and it therefore may be any diameter within limits. It will also be evident that by carefully adjusting the speed of the apex roller 54 to match the surface speed of the strip material in contact therewith, surface marring, drag, or slippage between the surfaces of the apex roller and the material can be reduced to a non-objectionable minimum. Furthermore, the diameter of the core of the coil can be controlled beyond the limits of present coiling machines by using an apex roller of suitable diameter and adjusting the rotational speed of the roller to compensate for the change in diameter.

Although the illustrative embodiment of the invention is a coiling machine of the upcoiler variety, it will be evident to those skilled in the art that, as aforesaid, the machine can be converted into a downcoiler by reversing the position of the coiling rollers and related members. To operate at a downcoiler, the apex roller 54 is vertically aligned beneath the base rollers 50 and 52 whose tangential plane is then inclined downwardly in the direction of travel of the strip. However, it is not intended that the invention be limited to either an upcoiler or a downcoiler since the inventive concept is equally applicable to both.

It is to be understood furthermore that while only one embodiment of the invention is shown herein, this embodiment is by way of example only and is not to be construed in a limiting sense. Other arrangements and modifications will occur to those skilled in the art and may be resorted to without departing from the scope of the invention.

I claim:

1. In a coiling machine operable to coil strip material being fed therethrough including three rollers arrayed in nesting spaced apart pyramidal relationship, the improvement comprising the provision of means to rotate oppositely the base and apex rollers respectively at differential speeds equal to the surface speeds of adjacent surfaces of the strip material, said means including a pinion stand having a driving pinion journaled therein, first, second and third shafts journaled therein, first and third driven pinions secured to said first and third shafts respectively, an idler pinion journaled in said stand for meshed engagement with said first and third pinions, said driving pinion being in meshed engagement with said first driven pinion, first motor means drivingly connected to said driving pinion, second motor means drivingly connected to said second shaft, means drivingly connecting said second shaft to said apex roller, and means drivingly connecting said first and third shafts to said base rollers, whereby said apex roller may be driven at the speed of the upper surface of strip material passing therethrough and said base rollers may be driven at the speed of the lower surface of said strip material.

2. In a coiling machine operable to coil strip material being fed therethrough including three coiling rollers arrayed in nesting spaced apart pyramidal relationship, and a pair of pinch rollers in vertical alignment, the improvement comprising the provision of means to rotate oppositely the base and apex coiling rollers and to rotate oppositely the pair of pinch rollers at speeds equal to the surface speeds of adjacent surfaces of strip material, said means comprising a pinion stand including a driving pinion journaled therein, a pair of pinch roller pinion shafts, an apex coiling roller pinion shaft, and a pair of base coiling roller pinion shafts journaled therein, meshed pinions secured to said pinching roller pinion shafts, pinions secured to said base coiling roller pinion shafts, an idler pinion in meshed engagement with said base roller pinions and idly carried on said apex coiling roller pinion shaft, said driving pinion being in meshed engagement with one of said pinch roller pinions and with one of said base coiling roller pinions, first motor means drivingly connected to said driving pinion, second motor means drivingly connected to said apex coiling roller pinion shaft, and means drivingly connecting said pinch roller shafts and said coiling roller shafts to their respective pinion shafts, whereby all of said rollers may be driven at the respective speeds of the surfaces of the strip material in contact with said rollers.

3. The machine set forth in claim 2 including means for adjusting the lower of said pinch rollers comprising a pair of resilient bearings supporting the opposite end portions of said lower roller and adapted to urge said lower roller upwardly into rolling contact with the under surface of said strip.

4. The machine set forth in claim 2 including means for adjusting the lower of said pinch rollers comprising a vertically adjustable cross beam, a pair of spring loaded bearings carried on the opposite ends of said cross beam, and adapted to support and urge said lower roller upwardly into rolling contact with the under surface of said strip.

5. The machine set forth in claim 2, including means for adjusting the lower of said vertically aligned pinch rollers comprising a pair of spring loaded bearings supporting the opposite end portions of said lower roller and adapted to urge said lower roller upwardly into rolling contact with the under surface of said strip, said spring loaded bearings including a pair of spring containers adjacent the under sides of said bearings, coil springs vertically aligned within said spring containers, a vertically adjustable cross beam extending transversely of said machine, spring compressing rods carried on the ends of said cross beam and projecting upwardly into said spring containers to engage the lower ends of said springs, and a pair of simultaneously operable screw jacks secured to said machine side members beneath the opposite ends of said crosshead for contact with the under sides thereof.

6. The machine set forth in claim 2, including a cradle to support said coil, rollers in said cradle to assist in the forming of said coil, and at least one of said rollers being gear driven by the upper of said pinch rollers.

References Cited in the file of this patent

UNITED STATES PATENTS

| | | |
|---|---|---|
| 1,779,115 | Dallas | Oct. 21, 1930 |
| 1,874,280 | Gibbons | Aug. 30, 1932 |
| 1,985,501 | Hudson | Dec. 25, 1934 |
| 2,038,305 | Mikaelson | Apr. 21, 1936 |
| 2,310,091 | Kepler | Feb. 2, 1943 |
| 2,312,988 | Kane | Mar. 2, 1943 |
| 2,640,525 | Le Tourneau | June 2, 1953 |

FOREIGN PATENTS

| | | |
|---|---|---|
| 577,699 | Germany | June 2, 1933 |